Figure 1:
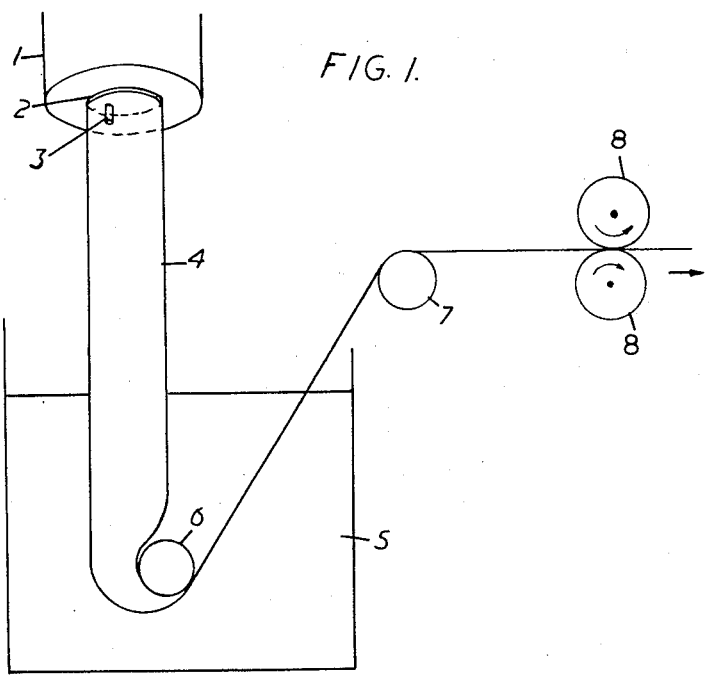

Oct. 30, 1962 M. STUDER ETAL 3,061,401
PROCESS FOR PRODUCING SYNTHETIC BAST OF LINEAR
POLYMERIC THERMOPLASTIC MATERIAL
Filed May 7, 1959

Inventors
Martin Studer   Walter Settele
Georg Michael Egger
By
Stevens Davis Miller & Mosher
Attorneys

United States Patent Office 3,061,401
Patented Oct. 30, 1962

3,061,401
PROCESS FOR PRODUCING SYNTHETIC BAST OF LINEAR POLYMERIC THERMOPLASTIC MATERIAL
Martin Studer, Walter Settele, and Georg Michael Egger, all of Lucerne, Switzerland, assignors to Societe de la Viscose Suisse, Emmenbrucke, Switzerland, a Swiss body corporate
Filed May 7, 1959, Ser. No. 811,675
Claims priority, application Great Britain June 11, 1958
6 Claims. (Cl. 18—54)

This invention relates to the production of a bast-like monofilament of linear polymeric thermoplastic material.

The manufacture of synthetic bast has in the past met with considerable difficulties. The cutting of plastic and other foils could not lead to satisfactory products, since the resulting laminate strips do not in any way show the specific bast character owing to their structure having no relief effect. Tows of regenerated cellulose have been produced by the viscose process using spinnerets having slit-like nozzles of various shapes, and have substantially the external appearance of natural bast. These products were, however, of limited use on account of their brittleness and low wet strength and knotting strength.

Consequently, an attempt was made to utilize the very good mechanical properties of certain high-polymeric thermoplastic materials, such as for example polyamides and polyesters, and to produce similar products from such materials. It is therefore an object of the present invention to provide synthetic bast-like material having the mechanical properties of filaments of high polymeric thermoplastic material, and to provide a method for making such material.

According to the invention, material of the type described is made by extruding a molten linear high polymeric thermoplastic material through an annular orifice in a spinneret so as to form a tubular filament, maintaining a slight superatmospheric gas pressure inside the said tubular filament, and passing the tubular filament, while it is still not completely hardened, through a cooling liquid and round a deflector in the cooling liquid in such a way as to flatten it.

The spinneret can be arranged on any suitable apparatus which is used for melting and extruding thermoplastic material, for example on an extrusion press, or on a melt-spinning apparatus such as described in British specification No. 553,307. From the spinneret the extruded tubular filament extends preferably vertically downwards. The centre of the spinneret is provided with an orifice by means of which the slight superatmospheric pressure is maintained inside the tubular filament; the gas used for this purpose should, of course, be inert towards the material of the filament at the spinning temperature; usually nitrogen is very suitable. The pressure so applied need be no more than suffices to prevent immediate collapse of the tube, usually a pressure between about 2 and 10 or 20 mm. of water.

Shortly after the extruded tubular filament has left the spinneret and within a distance in which the substance is still in a plastic condition, this tube is exposed to the action of a cooling liquid and is guided over a mechanical deflector. This can, for example, consist of a rigidly mounted rod, by means of which the filament is deflected from its direction and this is squeezed and folded under the action of the withdrawal tension, or of a narrow passage which exerts the same effect, or even of a pair of rollers so constructed that irregular folding and creasing takes place.

The cooled and flattened tubular filament is drawn away by a driven member, preferably a pair of rollers, under suitable tension.

The filament thus obtained is initially stretched to a slight extent by the action of the withdrawal tension, but it is still plastically extensible and can be stretched to its final length by known means, for example by means of two pairs of rollers, the supply rollers having a lower peripheral speed than the withdrawal rollers. Coinciding with the increase in length caused by the stretching is a decrease in width to the desired final width. This stretching can be carried out subsequently in a separate working stage, but is preferably continuous with the spinning before the filament is wound up.

The resulting filament surprisingly no longer has the character of a mere flattened or collapsed tube, as was to be expected by analogy with the expanded tube process known for the manufacture of foils, but it is found to be in the form of a strip which internally is at least partially agglutinated in an irreversible manner and has irregularly distributed permanent folds, creases and thickened portions, some of which are parallel to the longitudinal axis of the filament, while others run at varying angles thereto. This leads to an appearance of the filament which produces outstanding effects in woven and other fabrics produced therefrom. When these filaments are handled and worked, the characteristic noise which occurs when handling natural bast is produced.

Figure 2:
Figure 3:

The invention is further illustrated in the accompanying drawing, in which:

FIGURE 1 is a diagrammatic side view, partly in section, of a form of apparatus by means of which the novel synthetic bast can be made, FIGURE 2 is a plan view of a piece of synthetic bast, and FIGURE 3 is a cross-sectional view of the same piece.

Referring now to FIGURE 1 of the drawing, the apparatus comprises a spinneret 1 having an annular orifice 2, the spinneret being fitted to a melt spinning head (not shown). Within the annulus formed by the orifice 2 is a gas outlet pipe 3 through which an inert gas can be fed into a tubular filament 4 emerging from the orifice 2. This tubular filament enters a cooling bath 5, in which it passes under a deflector rod 6, which as shown in the drawing is placed asymmetrically with respect to the descending tube and by means of which it is simultaneously deflected and laid flat and folded by the action of the withdrawal tension. Thereafter, the tube leaves the bath and is conveyed over another rod 7 by means of a driven withdrawal member 8 consisting of two rollers, whence it passes to a stretching device and winding up device (not shown).

A typical product of the invention is illustrated in FIGURES 2 and 3, and consists of a flat ribbon-like filament having irregularly distributed creases, thickened portions, and agglutinations 9.

The invention is further illustrated by the following example.

*Example*

The apparatus used is that described above by reference to FIGURE 1 of the drawing, the diameter of the annular orifice being 16 mm., and its width 0.1 mm.

Nylon 66 (polyhexamethylene adipamide) melt is extruded through the annular orifice 2 at a rate of 29 g./min., and the tubular filament formed is introduced at a distance of 10 cm. below the spinneret 1 into water at room temperature. A superatmospheric pressure of 5 mm. water column is maintained inside the filament by means of nitrogen fed through the pipe 3. In the water bath the tube is deflected round the rigidly mounted round rod 6, which has a diameter of 2 cm., and is drawn over a similar deflecting rod 7 by means of the driven pair of rollers 8 at a speed of 100 m./min. It is found that, between the spinneret and the deflecting rod 6, pressure impulses are set up in the gas which is occluded in the tube as a result of the cooperation of the relatively strong squeezing action and the sudden cooling, these impulses leading to irregular vibration of the tube and so to irregular folding and creasing. From the withdrawal member 8 the filament is fed to a stretching device, which stretches it by 340% of its length, and is thereafter wound up. The synthetic bast thus obtained has a count of 760 den. and a width of 2.0±0.5 mm. Its thickness fluctuates from 0.06 to 0.08 mm. It has a dry tensile strength of 2.8 g./den. with a breaking elongation of 26%. The wet strength is 86% of the dry strength.

The process described is particularly suitable for use with polyamides such as the nylons and polyesters of the polyethylene terephthalate type, not only on account of their excellent mechanical properties, but especially on account of their good dimensional stability; moreover filaments manufactured from these materials retain their elasticity at relatively high temperatures and in the wet state, this being of course advantageous when they are dyed. However, the process can be used with other polymeric thermoplastic materials of melting point between 100° and 300° C.

Colour pigments or matting pigments can be admixed with the thermoplastic material prior to spinning, or the final product can be dyed. The similarity to bast of these filaments is further improved by the dyeing; the dyed filaments stand out in a particularly effective manner from the monotone dead aspect of a smooth thermoplastic laminate or tube.

We claim:

1. Process for the production of a synthetic material having the appearance of a bast fibre, comprising extruding a molten synthetic fibre-forming polymer through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated.

2. Process for the production of a synthetic material having the appearance of a bast fibre, comprising extruding a molten synthetic fibre-forming polymer through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated and subsequently stretching the product.

3. Process for the production of a synthetic material having the appearance of a bast fibre, comprising extruding a molten polyamide through an annular orifice to form a tubular fialment and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated.

4. Process for the production of a synthetic material having the appearance of a bast fibre, comprising extruding a molten polyamide through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated and subsequently stretching the product.

5. Process for the production of a synthetic material having the appearance of a bast fibre, comprising extruding a molten polyester through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated.

6. Process for the production of a synthetic material having the appearance of a bast fibre, comprising extruding a molten polyester through an annular orifice to form a tubular filament and maintaining with inert gas a slight superatmospheric and pulsating pressure inside the tubular filament, passing the filament while in the plastic state into a cooling liquid and then, while still in an agglutinative state, drawing it past a deflector with a stationary surface placed in the cooling liquid and pressing on one side only of the tubular filament, the surface of the deflector first contacting the filament being laterally displaced from the axis of the annular orifice, whereby the tubular filament is flattened and irregularly creased and folded and the opposite sides are at least partly agglutinated and subsequently stretching the product.

References Cited in the file of this patent

UNITED STATES PATENTS

| | | |
|---|---|---|
| 1,464,048 | Roussett | Aug. 7, 1923 |
| 1,631,071 | Snelling | May 31, 1927 |
| 1,990,434 | Kohler | Feb. 5, 1935 |
| 2,000,388 | Hofstadt | May 7, 1935 |
| 2,136,462 | Picard et al. | Nov. 15, 1938 |
| 2,461,975 | Fuller | Feb. 15, 1949 |
| 2,545,300 | Nixon | Mar. 13, 1951 |
| 2,612,679 | Ladisch | Oct. 7, 1952 |
| 2,717,424 | Francis et al. | Sept. 13, 1955 |
| 2,773,285 | Piazze et al. | Dec. 11, 1956 |
| 2,798,283 | Magat et al. | July 9, 1957 |
| 2,848,747 | Dixon | Aug. 26, 1958 |
| 2,897,547 | Weingaud | Aug. 4, 1959 |
| 2,905,648 | Haas | Sept. 22, 1959 |